(12) United States Patent
Lu et al.

(10) Patent No.: US 12,150,194 B2
(45) Date of Patent: Nov. 19, 2024

(54) METHOD FOR ESTABLISHING COMMUNICATION CONNECTION AFTER DEVICE IS OFFLINE AND SMART HOME SYSTEM

(71) Applicants: Gree Electric Appliances, Inc. of Zhuhai, Guangdong (CN); Zhuhai Leayun Technology Co., Ltd, Zhuhai (CN)

(72) Inventors: Jie Lu, Guangdong (CN); Jianwei Bai, Guangdong (CN); Zhiyang Chen, Guangdong (CN); Zhuoxin Jiang, Guangdong (CN); Zhangzhang Yan, Guangdong (CN)

(73) Assignees: Gree Electric Appliances, Inc. of Zhuhai, Zhuhai (CN); Leayun Technology Co., Ltd. of Zhuhai, Zhuhai (CN)

( * ) Notice: Subject to any disclaimer, the term of this patent is extended or adjusted under 35 U.S.C. 154(b) by 333 days.

(21) Appl. No.: 17/620,813

(22) PCT Filed: Jul. 6, 2020

(86) PCT No.: PCT/CN2020/100327
§ 371 (c)(1),
(2) Date: Dec. 20, 2021

(87) PCT Pub. No.: WO2021/057160
PCT Pub. Date: Apr. 1, 2021

(65) Prior Publication Data
US 2022/0361274 A1 Nov. 10, 2022

(30) Foreign Application Priority Data
Sep. 25, 2019 (CN) .......................... 201910914018.5

(51) Int. Cl.
*H04W 4/80* (2018.01)
*H04W 76/14* (2018.01)
*H04W 76/19* (2018.01)

(52) U.S. Cl.
CPC ............. *H04W 76/19* (2018.02); *H04W 4/80* (2018.02); *H04W 76/14* (2018.02)

(58) Field of Classification Search
CPC ....... H04W 4/80; H04W 12/04; H04W 12/06; H04W 12/50; H04W 12/64; H04W 76/11; H04W 76/14; H04W 8/005; H04W 84/12
See application file for complete search history.

(56) References Cited

U.S. PATENT DOCUMENTS

| 8,929,276 B2 * | 1/2015 | Du | H04W 12/50 370/315 |
|---|---|---|---|
| 2013/0315132 A1 | 11/2013 | Hou et al. | |

(Continued)

FOREIGN PATENT DOCUMENTS

| CN | 105392181 A | 3/2016 |
|---|---|---|
| CN | 105553808 A | 5/2016 |

(Continued)

OTHER PUBLICATIONS

International Search Report, with a mailing date of Oct. 10, 2020, in International application No. PCT/ CN2020/100336, filed on Jul. 6, 2020 (5 pages).

(Continued)

*Primary Examiner* — Cindy Trandai
(74) *Attorney, Agent, or Firm* — McAndrews, Held & Malloy, Ltd.

(57) ABSTRACT

The disclosure relates to the technical field of communications, and in particular, to a method for establishing a communication connection after a device is offline and a smart home system. The method for establishing the com- (Continued)

munication connection after the device is offline comprises: whether a first device is in an offline state in a Wi-Fi network under a wireless router is determined; when the first device is in the offline state, the first device is connected to at least one second device in Wi-Fi connection with the wireless router; and the first device establishes a communication connection with the wireless router by means of the second device. According to the method provided by the disclosure, an offline terminal can establish a communication connection with the wireless router by means of other terminals under the wireless router.

14 Claims, 7 Drawing Sheets

(56) References Cited

U.S. PATENT DOCUMENTS

| | | | |
|---|---|---|---|
| 2014/0126348 A1 | 5/2014 | Mahamuni et al. | |
| 2015/0016241 A1 | 1/2015 | Ruffini et al. | |
| 2015/0026580 A1* | 1/2015 | Kang | H04W 12/04 455/39 |
| 2015/0245182 A1* | 8/2015 | Scagnol | H04L 41/082 370/312 |
| 2015/0350910 A1 | 12/2015 | Eramian | |
| 2015/0381407 A1 | 12/2015 | Wang et al. | |
| 2016/0165387 A1* | 6/2016 | Nhu | H04W 4/80 455/41.1 |
| 2016/0174022 A1* | 6/2016 | Nhu | H04W 4/70 455/41.2 |
| 2016/0353233 A1* | 12/2016 | Yong | H04L 67/51 |
| 2017/0055104 A1* | 2/2017 | Wegelin | H04B 17/318 |
| 2017/0105176 A1* | 4/2017 | Finnegan | H04W 4/80 |
| 2017/0215030 A1* | 7/2017 | Choi | H04W 4/80 |
| 2017/0324489 A1* | 11/2017 | Wells | H04B 17/318 |
| 2019/0132396 A1* | 5/2019 | Finnegan | H04L 12/2818 |
| 2019/0141786 A1* | 5/2019 | Park | H04W 4/80 |
| 2019/0223248 A1* | 7/2019 | Chandran | H04L 12/2803 |
| 2019/0273777 A1* | 9/2019 | Virani | H04L 67/303 |
| 2020/0068627 A1* | 2/2020 | Zhang | H05B 47/11 |
| 2020/0336878 A1* | 10/2020 | Chieh Tseng | H04W 52/0203 |

FOREIGN PATENT DOCUMENTS

| | | |
|---|---|---|
| CN | 105722224 A | 6/2016 |
| CN | 106288154 A | 1/2017 |
| CN | 106506289 A | 3/2017 |
| CN | 108737528 A | 11/2018 |
| CN | 109391529 A | 2/2019 |
| CN | 109951881 A | 6/2019 |
| CN | 110636486 A | 12/2019 |

OTHER PUBLICATIONS

First Chinese search report dated Jun. 9, 2020 in Chinese application No. 2019109140185 (2 pages).

Second Chinese search report dated Apr. 20, 2021 in Chinese application No. 2019109140185 (2 pages).

Shu, Le et al., Efficient Mobile Content Delivery Based on Co-route Prediction in Urban Transport, IEEE Globecom 2010 proceedings.

Huan, WuChuan, Server System About Controlling Devices of Internet of Things Based on Wechat.

* cited by examiner

A plurality of terminals open bluetooth modules after receiving offline state information The bluetooth module of a first device detects the signal intensity of surrounding bluetooth modules The first device is connected to the terminal with the highest signal intensity to be as at least one second device to perform pairing connection

METHOD FOR ESTABLISHING COMMUNICATION CONNECTION AFTER DEVICE IS OFFLINE AND SMART HOME SYSTEM The disclosure is a 371 of International Patent Application No. PCT/CN2020/100327, filed Jul. 6, 2020, which claims priority to Chinese patent application No. 201910914018.5, filed to the China National Intellectual Property Administration on Sep. 25, 2019 and entitled "Method for Establishing Communication Connection after Device Is Offline and Smart Home System", the disclosure of which is hereby incorporated by reference in its entirety.

TECHNICAL FIELD

The disclosure relates to the technical field of communications, and in particular, to a method for establishing a communication connection after a device is offline and a smart home system.

BACKGROUND

At present, smart appliances having Wi-Fi functions have an automatic reconnection mechanism. However, when connection is failed for a plurality of times, a device is in an offline state, which cannot be controlled. Therefore, the appliances need to artificially re-access to a home network to recover control, which may not bring convenient and fast experience for users.

SUMMARY

In order to resolve the above technical problem, the disclosure provides a method for performing data transmission after a device is offline and a smart home system.

On the first aspect, the disclosure provides a method for establishing a communication connection after a device is offline, includes:

Whether a first device is in an offline state in a Wi-Fi network under a wireless router is determined.

The first device is connected to at least one second device in Wi-Fi connection with the wireless router when the first device is in the offline state.

The first device establishes a communication connection through the at least one second device with the wireless router.

Further, the at least one second device in Wi-Fi connection with the wireless router is searched when the first device is in the offline state in the Wi-Fi network under the wireless router.

A communication connection is established between the first device and the at least one second device, to make the first device to perform data transmission with the wireless router through the at least one second device.

Further, searching the at least one second device in Wi-Fi connection with the wireless router includes the following operations.

The first device opens a bluetooth module after the first device is disconnected to the Wi-Fi of the wireless router.

The bluetooth module of the first device sends offline state information of the first device to the wireless router by means of a bluetooth gateway, so that all terminals connected with the wireless router are set as the at least one second devices after the wireless router receives the offline state information.

Further, establishing the communication connection between the first device and the at least one second device includes:

The bluetooth module of the first device sends the offline state information and bluetooth configuration information of the first device to the bluetooth gateway, which forwards the offline state information and the bluetooth configuration information to the wireless router, so that the wireless router issues the received information to the at least one second device, and the at least one second device enables the bluetooth module to open a bluetooth function.

Pairing connection is performed on the bluetooth module of the first device and the bluetooth module of the at least one second device.

Further, the wireless router issues the offline state information and bluetooth configuration information of the first device to a plurality of terminals in a current local area network in a manner of Wi-Fi communication.

The plurality of terminals all enable the bluetooth modules to open the respective bluetooth functions.

The bluetooth module of the first device detects signal intensity of other bluetooth modules in a periodic environment, and the terminal with the highest signal intensity is selected as the at least one second device to perform bluetooth pairing connection.

Further, establishing the communication connection between the first device and the at least one second device includes:

After pairing connection is performed on the bluetooth module of the first device and the bluetooth module of the at least one second device, the bluetooth module of the at least one second device transfers Wi-Fi configuration information of the at least one second device to the bluetooth module of the first device.

The bluetooth module of the first device transmits the Wi-Fi configuration information of the at least one second device to a Wi-Fi module of the first device.

The Wi-Fi module of the first device is connected to a Wi-Fi module of the at least one second device according to the Wi-Fi configuration information of the at least one second device.

Further, after the Wi-Fi module of the first device is successfully connected to the Wi-Fi module of the at least one second device, the bluetooth modules of all the devices are closed.

Further, determining whether the first device is in the offline state in the Wi-Fi network under the wireless router includes: performing automatic reconnection after the first device is disconnected to the wireless router, and determining the first device to be in the offline state when connection is failed for a plurality of times.

Further, the first device firstly establishes a connection with a plurality of terminals when the first device is in the offline state in the network under the wireless router.

The first device attempts to perform information interaction with the wireless router by means of the terminal connected to the first device, and the terminal successfully achieving interaction is determined as the at least one second device.

On the second aspect, the disclosure provides a smart home system. The smart home system includes a wireless router and a plurality of terminals in a Wi-Fi network. After a first device in each of the terminals is offline, the method provided by the disclosure is adopted to establish a communication connection.

According to the method provided by the disclosure, an offline terminal can establish a communication connection with the wireless router by means of other terminals under the wireless router. Therefore, transmission of data information of an offline device can be realized, self-selection of a network node and re-access to a network are achieved. In this way, control may be achieved, convenience use for a user may be achieved as well, and the user does not need to worry about the uncontrollable offline of a smart device.

BRIEF DESCRIPTION OF THE DRAWINGS

Drawings are incorporated into the specification and constitute a part of the specification. The drawings illustrate embodiments in accordance with the disclosure and serve to understand the principles of the invention together with the specification.

In order to more clearly illustrate the embodiments of the disclosure or the technical solutions in the related art, the drawings used in the description of the embodiments or the related art will be briefly described below. It is apparent that other drawings can be obtained from those skilled in the art according to these drawings without any creative work.

DETAILED DESCRIPTION OF THE EMBODIMENTS

In order to make objectives, technical solutions, and advantages of embodiments of the disclosure clearer, the technical solutions in the embodiments of the disclosure will be clearly and completely described below in combination with the drawings in the embodiments of the disclosure. It is apparent that the described embodiments are only part of the embodiments of the disclosure, not all the embodiments. Based on the embodiments in the disclosure, all other embodiments obtained by those of ordinary skilled in the art without creative work shall fall within the protection scope of the disclosure.

Figure 1:
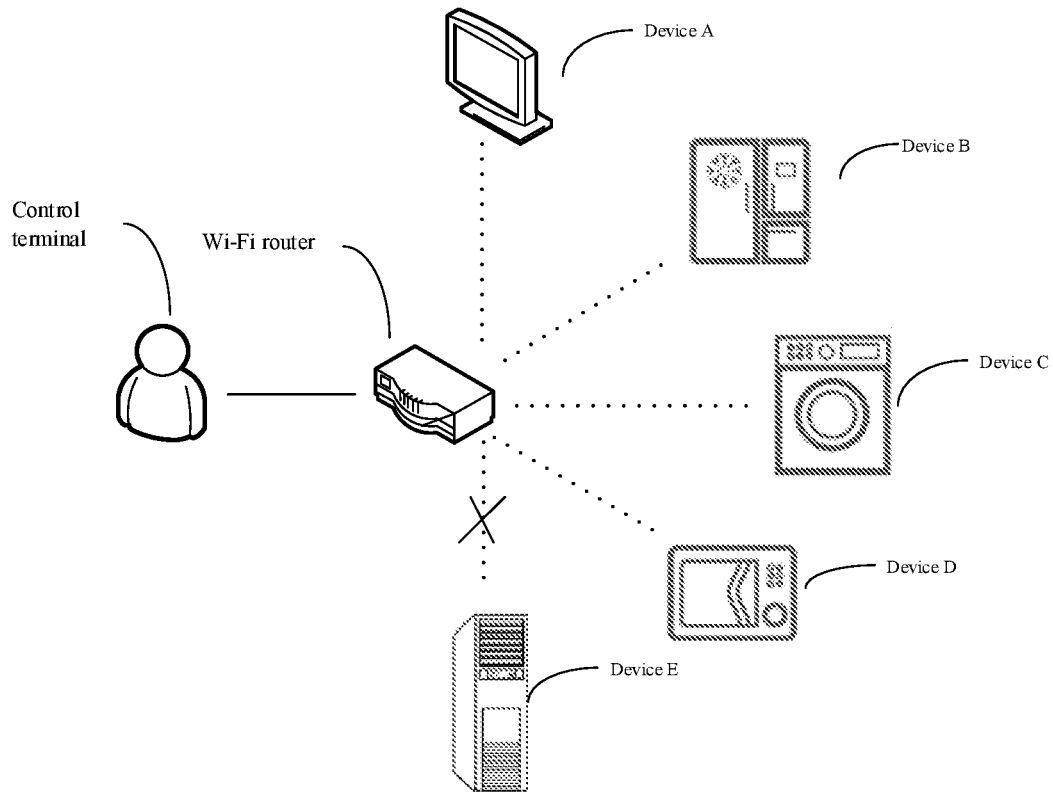
FIG. 1 is an environment diagram of a method for establishing a communication connection after a device is offline according to one embodiment of this application.

FIG. 1 is an environment diagram of a method for performing data transmission after a device is offline according to one embodiment of this application. Referring to FIG. 1, the method for performing data transmission after a device is offline may be applied to a smart home system and an internet of things system. The smart home system includes a control terminal, a Wi-Fi router, and a plurality of terminals (such as a device A, a device B, a device C, a device D, and a device E in FIG. 1). The plurality of terminals all are in a local area network under the Wi-Fi router. The control terminal controls the plurality of terminals by using the Wi-Fi router. Data information of the terminals may also be transmitted to the control terminal by using the Wi-Fi router. The terminals may specifically be mobile terminals or household appliances. The mobile terminals may specifically be mobile phones, tablet computers, or notebook computers. The household appliances may be at least one of air conditioners, refrigerators, washing machines, and microwave ovens. In a specific scene in FIG. 1, the terminals, such as the device A, the device B, the device C, the device D, and the device E, all are smart appliances or devices having a Wi-Fi function. When a connection between a Wi-Fi module of each terminal and the Wi-Fi router is interrupted, the terminal usually has an automatic reconnection mechanism. However, when the connection is failed for a plurality of times, the terminal is in an offline state, which cannot be controlled. For example, after the communication of the device E in FIG. 1 is disconnected with the Wi-Fi router, the offline terminal device E is required to artificially re-access to a network under the Wi-Fi router. In this way, the control of the control terminal to the terminal E may be recovered, but it cannot bring convenient and fast experience for a user.

Embodiment I

Figure 2:
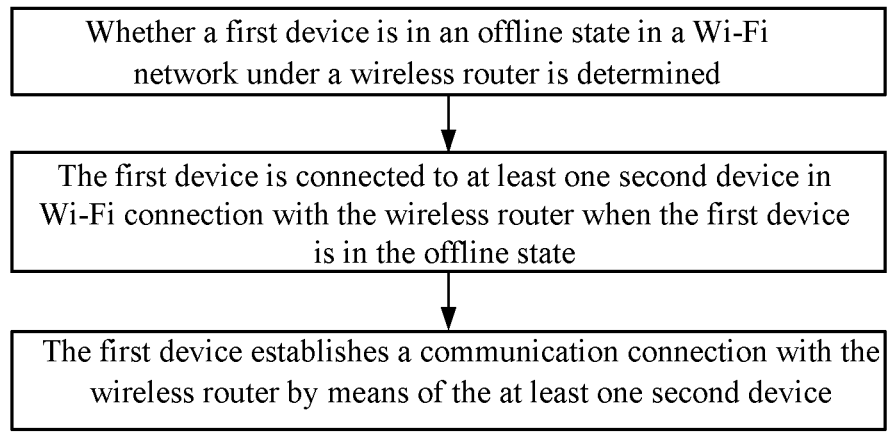
FIG. 2 is a flowchart of a method for establishing a communication connection after a device is offline according to one embodiment of this application.

In order to resolve the foregoing technical problems, in an embodiment, a method for establishing a communication connection is provided after a device is offline. In this embodiment, the method is mainly taken as an example to be applied to the application scene in FIG. 1. Referring to FIG. 2, the method for establishing a communication connection after a device is offline specifically includes the following steps.

Firstly, whether a first device is in an offline state in a Wi-Fi network under a wireless router is determined. A specific implementation of the step may include as follows. After the first device is disconnected to the wireless router, automatic reconnection is performed. When a connection is failed for a plurality of times, that the first device is in the offline state is determined. For example, the time for automatic reconnection may be set to 5 times. When the connection is failed for 5 times, the first device is determined to be in the offline state, which no longer performs reconnection.

Then, the first device is connected to at least one second device in Wi-Fi connection with the wireless router when the first device is in the offline state. Specifically, in FIG. 1, a device E is the first device. The at least one second device may be one of a device A, a device B, a device C, and a device D in FIG. 1.

Finally, the first device establishes a communication connection with the wireless router by using the at least one second device. That is to say, a control terminal may control the at least one second device by using a Wi-Fi router, and data information of the at least one second device may also be transmitted to the control terminal by using the Wi-Fi router.

According to the method provided by this embodiment, the offline first device may establish a communication connection with the wireless router by means of the at least one second device under the wireless router. The at least one second device is used as a relay device between the first device and the wireless router, so that the first device may re-access to a network. In this way, control may be achieved, convenience use for a user may be achieved as well, and the user does not need to worry about the uncontrollable offline of the first device.

Embodiment II

Figure 3:
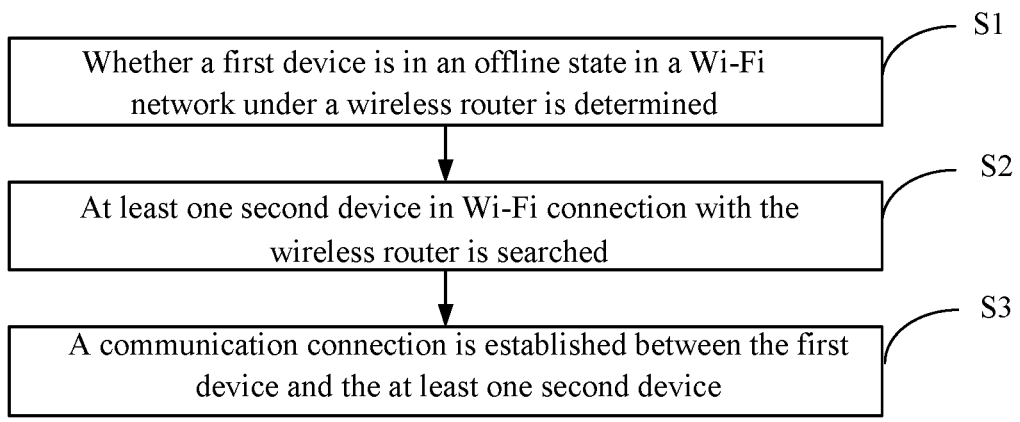
FIG. 3 is a flowchart of a method for establishing a communication connection after a device is offline according to one embodiment of this application.

In order to resolve the foregoing technical problems, in an embodiment, a method for establishing a communication connection after a device is offline is provided. In this embodiment, the method is mainly taken as an example to be applied to the application scene in FIG. 1. Referring to FIG. 3, the method for establishing a communication connection after a device is offline specifically includes the following steps.

At S1, whether a first device is in an offline state in a Wi-Fi network under a wireless router is determined. A specific determination method may be implemented by referring to Embodiment I.

At S2, when the first device is in the offline state in the Wi-Fi network under the wireless router, at least one second device in Wi-Fi connection with the wireless router is searched.

At S3, a communication connection is established between the first device and the at least one second device to make the first device to perform data transmission with the wireless router through the at least one second device.

A difference between this embodiment and Embodiment I lies in that, the at least one second device in Wi-Fi connection with the wireless router may be searched firstly, and then a connection between the first device and the at least one second device is realized.

Figure 4:
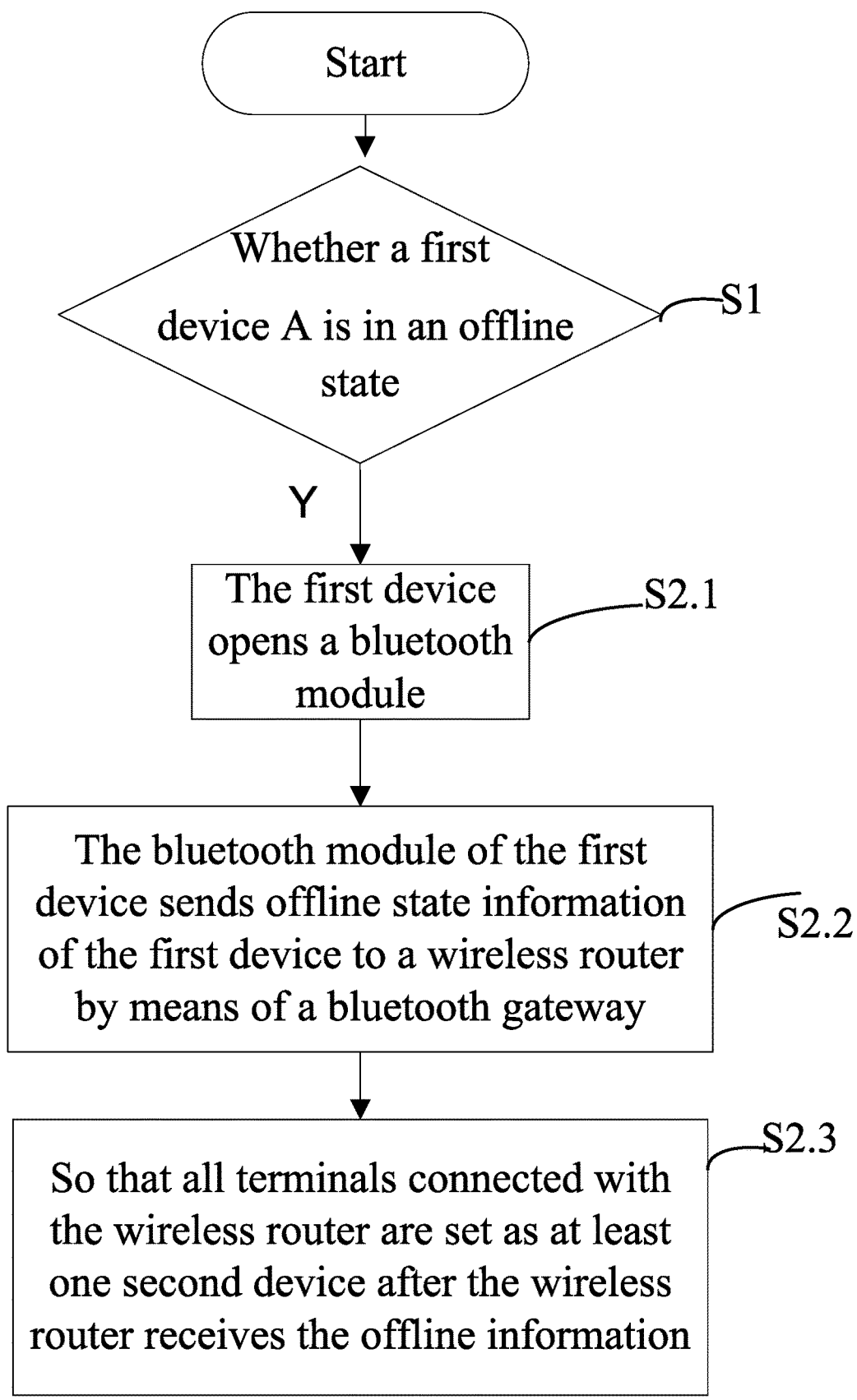
FIG. 4 is a flowchart showing the searching of a at least one second device in Wi-Fi connection with a wireless router.

Specifically, in S2, the specific step of searching the at least one second device in Wi-Fi connection with the wireless router may be shown in FIG. 4, and specifically includes as follows.

At S2.1, the first device opens a bluetooth module after the first device is disconnected to the Wi-Fi of the wireless router. After, in S1, the first device is determined to be in the offline state, the bluetooth module of the first device may be opened.

At S2.2, the bluetooth module of the first device sends offline state information of the first device to the wireless router by means of a bluetooth gateway. In this case, the bluetooth gateway may be set as a relay device between the first device and the wireless router. Since bluetooth communication is relative to Wi-Fi communication, there are deficiencies in communication rate and communication quality, so that complete replacing cannot be achieved. Thus, in this embodiment, bluetooth communication is merely taken as a communication line for temporary transmission of information.

At S2.3, so that all terminals connected with the wireless router are set as the at least one second device after the wireless router receives the offline information. In this step, the wireless router may issue the offline state information to terminals in a current local area network in a manner of Wi-Fi communication. The wireless router can determine the terminals that may perform normal Wi-Fi communication with the wireless router through information interaction. The terminals may be set as the at least one second device for establishing a connection with the first device.

Figure 5:
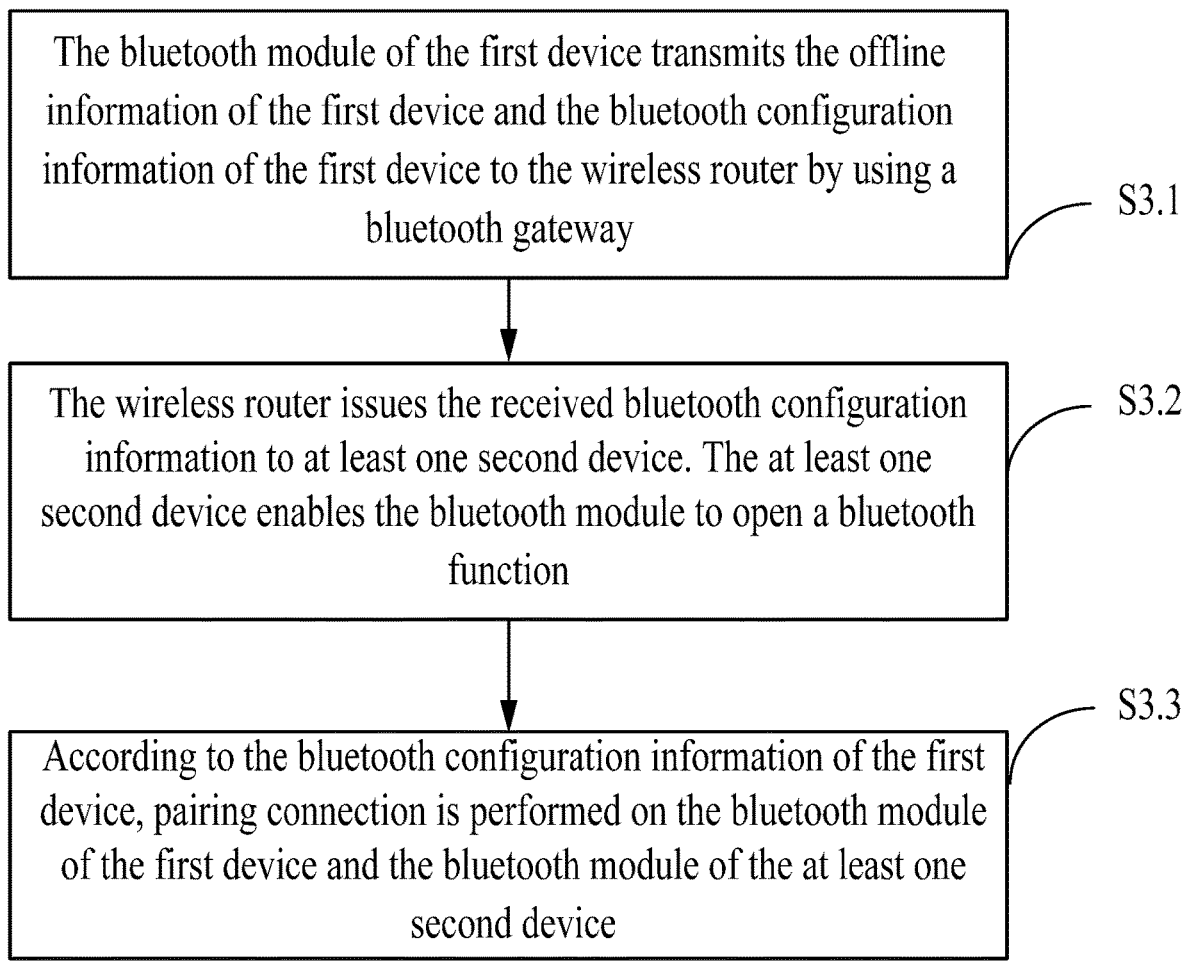
FIG. 5 is a flowchart of a step of establishing a communication connection between a first device and at least one second device.

After the at least one second device in Wi-Fi connection with the wireless router is searched, a communication connection is established between the first device and the at least one second device to make the first device to perform data transmission with the wireless router through the at least one second device. The step of establishing the communication connection between the first device and the at least one second device may be shown in FIG. 5, and specifically includes as follows.

At S3.1, the bluetooth module of the first device transmits the offline information of the first device and the bluetooth configuration information of the first device to the wireless router by using a bluetooth gateway. The bluetooth configuration information includes, but is not limited to the mac of the first device bluetooth module and a secret key, which may be specifically determined according to pairing requirements adopted by the bluetooth module. Bluetooth pairing information of the first device may be sent to the wireless router by the bluetooth gateway, along with the offline state information of the first device in S2.1.

At S3.2, the wireless router issues the received bluetooth configuration information of the first device to the at least one second device. The at least one second device enables the bluetooth module to open a bluetooth function. The bluetooth pairing information of the first device may be sent to the at least one second device by the wireless router, along with the offline state information of the first device in S2.2.

At S3.3, according to the bluetooth configuration information of the first device, pairing connection is performed on the bluetooth module of the first device and the bluetooth module of the at least one second device. In this way, data transmission between the first device and the at least one second device is realized through the pairing connection of the bluetooth modules.

Figure 6:
FIG. 6 is a flowchart of a method for establishing a communication connection after a device is offline according to one embodiment of this application.
Figure 6:

In some implementations, in the above step, as shown in FIG. 6, the wireless router may issue the offline state information and bluetooth configuration information of the first device to the plurality of terminals (such as a device A, a device B, a device C, and a device D in FIG. 1) in the current local area network in the manner of Wi-Fi communication. The plurality of terminals enable the bluetooth modules to open the respective bluetooth functions. The bluetooth module of the first device detects signal intensity of other bluetooth modules in a periodic environment, and the terminal with the highest signal intensity is selected as the at least one second device to perform bluetooth pairing connection.

Through S3.1 to S3.3, a communication connection is established between the first device and the at least one second device, so that data transmission between the wireless router and the first device may be realized. The at least one second device is set as a relay device between the first device and the wireless router, so that the first device may re-access to a network, so as to achieve a purpose of control, and convenient use for a user is achieved.

Embodiment III

Figure 7:
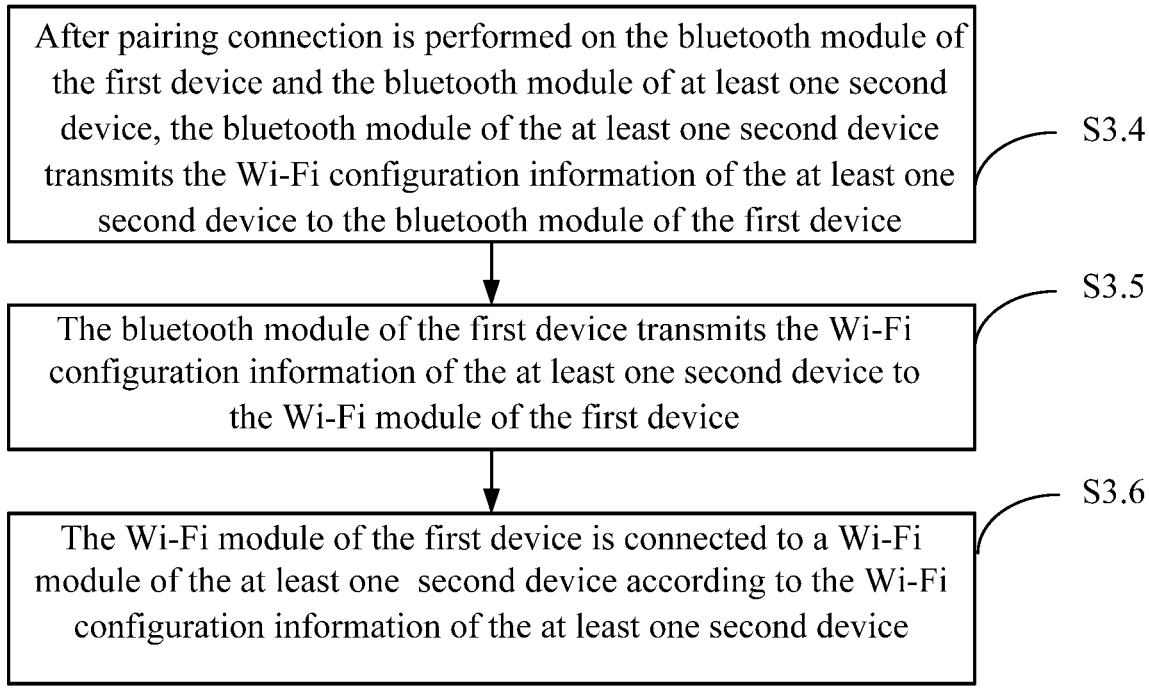
FIG. 7 is a flowchart of a method for establishing a communication connection after a device is offline according to one embodiment of this application.

As mentioned above, since bluetooth communication is relative to Wi-Fi communication, there are deficiencies in communication rate and communication quality. In Embodiment II, through S3.1 to S3.3, the communication connection establishing between the first device and the at least one second device still cannot satisfy requirements. In order to resolve the technical problem, as shown in FIG. 7, on the basis of Embodiment II, S3 further includes the following steps.

At S3.4, after pairing connection is performed on the bluetooth module of the first device and the bluetooth module of the at least one second device, the bluetooth module of the at least one second device transmits the Wi-Fi configuration information of the at least one second device to the bluetooth module of the first device. The Wi-Fi configuration information includes, but is not limited to the mac of the at least one second device bluetooth module and a secret key, which may be specifically determined according to connection requirements adopted by the bluetooth module.

At S3.5, the bluetooth module of the first device transmits the Wi-Fi configuration information of the at least one second device to the Wi-Fi module of the first device.

At S3.6, the Wi-Fi module of the first device is connected to a Wi-Fi module of the at least one second device according to the Wi-Fi configuration information of the at least one second device.

In this way, Wi-Fi communication based data transmission is formed between the first device and the at least one second device. For Embodiment II, the communication rate and communication quality between the first device and the at least one second device are stronger. It is not much different from the state before the first device is offline.

Preferably, after the Wi-Fi module of the first device is successfully connected to the Wi-Fi module of the at least one second device, the bluetooth modules of all the devices are closed, so that power consumption may be reduced.

Embodiment IV

Figure 8:
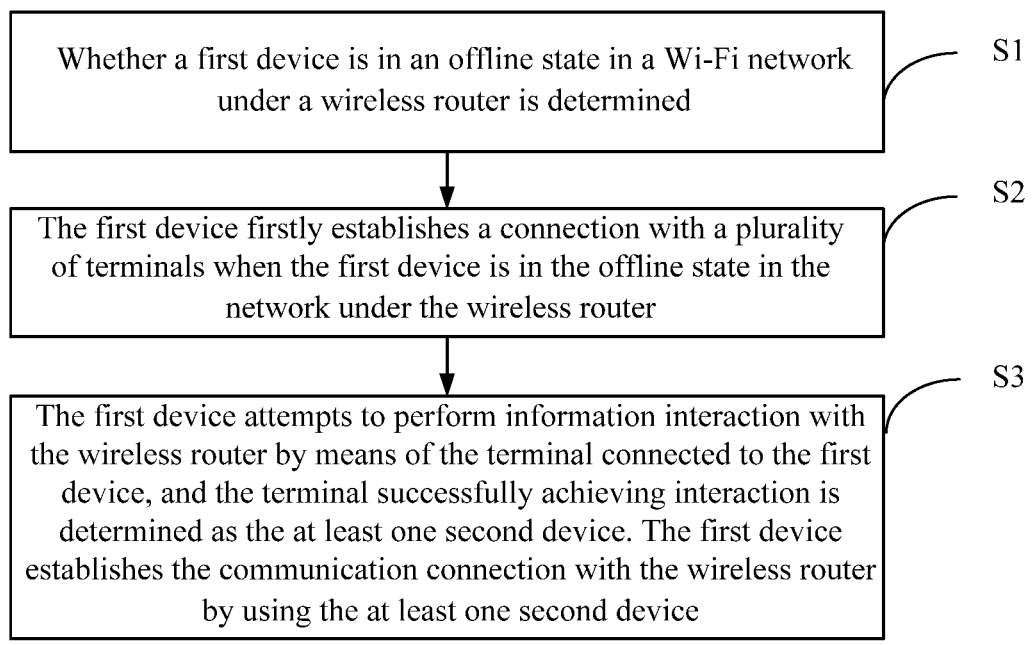
FIG. 8 is a flowchart of a method for establishing a communication connection after a device is offline according to one embodiment of this application.

In order to resolve the foregoing technical problems, in this embodiment, another method for establishing a communication connection after a device is offline is provided. In this embodiment, the method is mainly set as an example to be applied to the application scene in FIG. 1. Referring to FIG. 8, the method for establishing a communication connection after a device is offline specifically includes the following steps.

At S1, whether a first device is in an offline state in a Wi-Fi network under a wireless router is determined. A specific determination method may be implemented by referring to Embodiment I.

At S2, when the first device is in the offline state in the network under the wireless router, the first device firstly establishes a connection with a plurality of terminals. A connection method is not specifically limited, and includes, but is not limited to any one of bluetooth connection and Wi-Fi connection.

At S3, the first device attempts to perform information interaction with the wireless router by means of the terminal connected to the first device, and the terminal successfully achieving interaction is determined as the at least one second device. The first device establishes the communication connection with the wireless router by using the at least one second device.

A difference between this embodiment and Embodiment II and Embodiment III lies in that, firstly, the first device is connected to at least one terminal. Then whether the connected terminal may be in Wi-Fi connection with the wireless router is determined. Then, the terminal that may be in Wi-Fi connection with the wireless router is selected as the at least one second device. Then, a connection between the first device and the wireless router is realized by using the at least one second device. Therefore, an alternative replacing solution is provided.

Embodiment V

Figure 9:
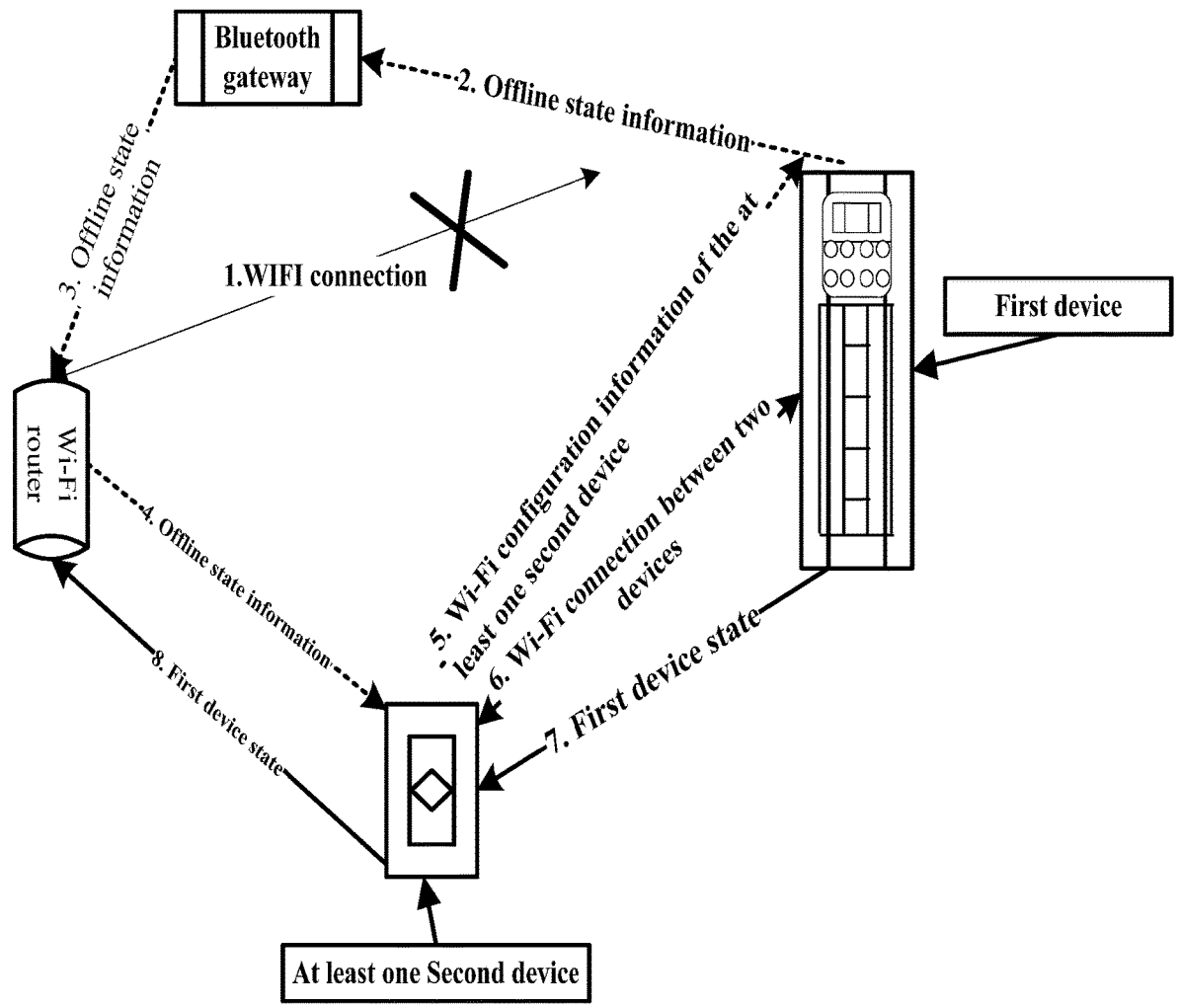
FIG. 9 is a schematic structural diagram of a smart home system according to one embodiment of this application.

In this embodiment, a smart home system is provided. As shown in FIG. 9, the smart home system includes a wireless router and a plurality of terminals (at least including a first device and a second device) in a Wi-Fi network. After a first device in each of the terminals is offline, the method according to any one of Embodiment I to Embodiment III of the disclosure may be adopted to perform data transmission. Definitely, the terminals in the above smart home system include, but are not limited to at least one of mobile phones, tablet computers, notebook computers, air conditioners, refrigerators, washing machines, and microwave ovens. Bluetooth gateways configured to be connected to bluetooth modules are further disposed in the smart home system, and may perform data transmission with the wireless router. According to step sequences of 1-8, FIG. 9 illustrates a process of realizing a connection between the first device and the wireless router after the first device is offline and transmitting device state information to the wireless router.

Those skilled in the art can understand that all or part of the processes in the above method embodiments may be implemented by a computer program to instruct related hardware, and the program may be stored in a non-volatile computer-readable storage medium. When the program is executed, the flow of each method embodiment as described above may be included. Any references to memories, storages, databases or other media used in embodiments provided by the disclosure may include non-volatile and/or volatile memories. The non-volatile memories may include a Read-Only Memory (ROM), a programmable ROM (PROM), an electrically programmable ROM (EPROM), an electrically erasable and programmable ROM (EEPROM), or a flash memory. The volatile memories may include a Random Access Memory (RAM), or an external cache memory.

It is also to be noted that relational terms such as first and second are used merely to distinguish one entity or operation from another entity or operation herein, and do not necessarily require or imply the existence of any such actual relationship or order between these entities or operations. Furthermore, terms "comprise", "include" or any other variants are intended to encompass non-exclusive inclusion, such that a process, a method, an article or a device including a series of elements not only include those elements, but also includes other elements not listed explicitly or includes intrinsic elements for the process, the method, the article, or the device. Without any further limitation, an element defined by the phrase "comprising one" does not exclude existence of other same elements in the process, the method, the article, or the device that includes the elements.

The above is merely the implementation of the disclosure, to make a person skilled in the art to understand or implement the disclosure. It is apparent that the technical personnel in the art will make many modifications to these embodiments, the general principles defined in the disclosure may be achieved in the other embodiments without departing from the spirit or essential attributes of the disclosure. Therefore, the disclosure will not be limited to the embodiments shown herein, but to conform to the maximum extent of principles and new features that are disclosed herein.

What is claimed is:

1. A method for establishing a communication connection after a device is offline, comprising:
   determining whether a first device is in an offline state in a Wi-Fi network under a wireless router;
   connecting the first device with at least one second device in Wi-Fi connection with the wireless router when the first device is in the offline state; and establishing a communication connection between the first device and the wireless router through the at least one second device;
wherein the method further comprising:
searching the at least one second device in Wi-Fi connection with the wireless router when the first device is in the offline state in the Wi-Fi network under the wireless router; and
establishing a communication connection between the first device and the at least one second device to make the first device to perform data transmission with the wireless router through the at least one second device, and
wherein searching the at least one second device in Wi-Fi connection with the wireless router, further comprising:
opening a bluetooth module of the first device after the first device is disconnected to Wi-Fi of the wireless router; and
sending offline state information of the first device to the wireless router by means of a bluetooth gateway through the bluetooth module of the first device, so that the wireless router sets all terminals connected with the wireless router as the at least one second device after the wireless router receives the offline state information.

2. The method for establishing a communication connection after a device is offline as claimed in claim 1, wherein establishing the communication connection between the first device and the at least one second device, further comprising:
sending, through the bluetooth module of the first device, offline state information and bluetooth configuration information of the first device to the bluetooth gateway, which forwards the offline state information and the bluetooth configuration information to the wireless router, so that the wireless router issues the received information to the at least one second device and the at least one second device enables the bluetooth module to open a bluetooth function; and
performing pairing connection on the bluetooth module of the first device and the bluetooth module of the at least one second device.

3. The method for establishing a communication connection after a device is offline as claimed in claim 2, further comprising:
issuing the offline state information and bluetooth configuration information of the first device to a plurality of terminals in a current local area network in a manner of Wi-Fi communication by the wireless router;
enabling the bluetooth modules of each of the plurality of terminals to open the respective bluetooth functions; and
detecting signal intensity of other bluetooth modules in a periodic environment by the bluetooth module of the first device, and selecting the terminal with the highest signal intensity as the at least one second device to perform bluetooth pairing connection.

4. The method for establishing a communication connection after a device is offline as claimed in claim 2, wherein establishing the communication connection between the first device and the at least one second device, further comprising:
transmitting Wi-Fi configuration information of the at least one second device to the bluetooth module of the first device by the bluetooth module of the at least one second device after performing pairing connection on the bluetooth module of the first device and the bluetooth module of the at least one second device;
transmitting the Wi-Fi configuration information of the at least one second device to a Wi-Fi module of the first device by the bluetooth module of the first device; and
connecting to a Wi-Fi module of the at least one second device according to the Wi-Fi configuration information of the at least one second device by the Wi-Fi module of the first device.

5. The method for establishing a communication connection after a device is offline as claimed in claim 4, wherein the bluetooth modules of all the devices are closed after the Wi-Fi module of the first device is successfully connected to the Wi-Fi module of the at least one second device.

6. The method for establishing a communication connection after a device is offline as claimed in claim 1, wherein determining whether the first device is in the offline state in the Wi-Fi network under the wireless router, further comprising: performing automatic reconnection after the first device is disconnected to the wireless router, and determining the first device to be in the offline state when connections are failed for a plurality of times.

7. The method for establishing a communication connection after a device is offline as claimed in claim 1, further comprising:
establishing a connection with a plurality of terminals by the first device firstly when the first device is in the offline state in the network under the wireless router; and
determining the terminal successfully achieving interaction as the at least one second device when the first device attempts to perform information interaction with the wireless router by means of the terminal connected to the first device.

8. A smart home system, comprising a wireless router and a plurality of terminals in a Wi-Fi network, wherein after first devices in the terminals are offline, the following steps are adopted to establish a communication connection:
determine whether a first device is in an offline state in a Wi-Fi network under a wireless router;
connect the first device with at least one second device in Wi-Fi connection with the wireless router when the first device is in the offline state; and
establish a communication connection between the first device and the wireless router through the at least one second device;
wherein search the at least one second device in Wi-Fi connection with the wireless router when the first device is in the offline state in the Wi-Fi network under the wireless router; and
establish a communication connection between the first device and the at least one second device to make the first device to perform data transmission with the wireless router through the at least one second device; and
open a bluetooth module of the first device after the first device is disconnected to Wi-Fi of the wireless router; and
send offline state information of the first device to the wireless router by means of a bluetooth gateway through the bluetooth module of the first device, so that the wireless router sets all terminals connected with the wireless router as the at least one second device after the wireless router receives the offline state information.

9. The smart home system as claimed in claim 8, wherein the following steps are adopted to establish a communication connection:

send, through the bluetooth module of the first device, offline state information and bluetooth configuration information of the first device to the bluetooth gateway, which forwards the offline state information and the bluetooth configuration information to the wireless router, so that the wireless router issues the received information to the at least one second device and the at least one second device enables the bluetooth module to open a bluetooth function; and perform pairing connection on the bluetooth module of the first device and the bluetooth module of the at least one second device.

10. The smart home system as claimed in claim 9, wherein the following steps are adopted to establish a communication connection:

issue the offline state information and bluetooth configuration information of the first device to a plurality of terminals in a current local area network in a manner of Wi-Fi communication by the wireless router;

enable the bluetooth modules of each of the plurality of terminals to open the respective bluetooth functions; and detect signal intensity of other bluetooth modules in a periodic environment by the bluetooth module of the first device, and selecting the terminal with the highest signal intensity as the at least one second device to perform bluetooth pairing connection.

11. The smart home system as claimed in claim 9, wherein the following steps are adopted to establish a communication connection:

transmit Wi-Fi configuration information of the at least one second device to the bluetooth module of the first device by the bluetooth module of the at least one second device after performing pairing connection on the bluetooth module of the first device and the bluetooth module of the at least one second device;

transmit the Wi-Fi configuration information of the at least one second device to a Wi-Fi module of the first device by the bluetooth module of the first device; and connect to a Wi-Fi module of the at least one second device according to the Wi-Fi configuration information of the at least one second device by the Wi-Fi module of the first device.

12. The smart home system as claimed in claim 11, wherein the bluetooth modules of all the devices are closed after the Wi-Fi module of the first device is successfully connected to the Wi-Fi module of the at least one second device.

13. The smart home system as claimed in claim 8, wherein the following steps are adopted to establish a communication connection:

perform automatic reconnection after the first device is disconnected to the wireless router, and determining the first device to be in the offline state when connections are failed for a plurality of times.

14. The smart home system as claimed in claim 8, wherein the following steps are adopted to establish a communication connection:

establish a connection with a plurality of terminals by the first device firstly when the first device is in the offline state in the network under the wireless router; and determine the terminal successfully achieving interaction as the at least one second device when the first device attempts to perform information interaction with the wireless router by means of the terminal connected to the first device.

\* \* \* \* \*